United States Patent [19]
Wright et al.

[11] 3,752,259
[45] Aug. 14, 1973

[54] SOUND REDUCING DEVICE FOR USE WITH BAR FED MACHINERY

[75] Inventors: Donald James Wright, Stapleford; James Boote, Burton Joyce, both of England

[73] Assignee: Wright Engineering Company (Nottingham) Limited, Nottingham, England

[22] Filed: Jan. 12, 1972

[21] Appl. No.: 217,373

[30] Foreign Application Priority Data
May 13, 1971 Great Britain.................. 14,736/71

[52] U.S. Cl................. 181/33 M, 138/148, 193/38
[51] Int. Cl...... G10k 11/00, B65g 11/16, F16l 9/22
[58] Field of Search............. 181/33 K, 33 M, 33 Q; 193/38, 25 E; 138/148, 149, 140; 226/102

[56] References Cited
UNITED STATES PATENTS

| | | | |
|---|---|---|---|
| 3,173,196 | 3/1965 | Grimm | 138/148 X |
| 2,534,811 | 12/1950 | Corlett | 181/33 M |
| 2,815,252 | 12/1957 | Baker | 193/38 UX |
| 2,933,173 | 4/1960 | Lakins | 193/38 |
| 2,982,311 | 5/1961 | Haskell | 138/148 X |
| 3,150,753 | 9/1964 | Ivanyi | 193/25 E |

FOREIGN PATENTS OR APPLICATIONS

| | | | |
|---|---|---|---|
| 1,107,132 | 3/1968 | Great Britain | 138/148 |
| 377,020 | 7/1932 | Great Britain | 138/148 |

Primary Examiner—Richard B. Wilkinson
Assistant Examiner—John F. Gonzales
Attorney—George B. White

[57] ABSTRACT

A device for reducing sound created by feeding of metallic bar material to a machine working the bar, the device comprising a substantially rigid tube of plastics material for positioning around the bar and within the bar carrier tube of said machine, in which said tube has a plurality of longitudinal ribs on its curved surface so that in use a plurality of chambers are formed between said plastics tube and the bar feed or carrier tube. In use the chambers may be left empty or filled with acoustic insulating material.

10 Claims, 11 Drawing Figures

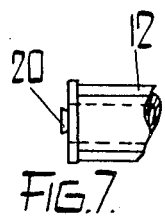
FIG. 7.
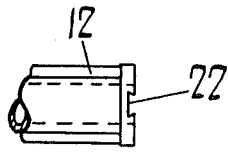
FIG. 8.
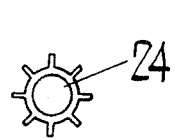 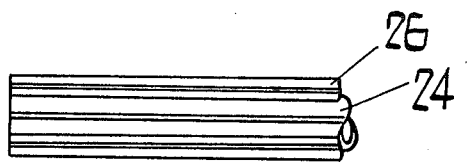
FIG 10  FIG. 9.

Patented Aug. 14, 1973

SOUND REDUCING DEVICE FOR USE WITH BAR FED MACHINERY

This invention relates to a device for reducing the sound created by feeding of metallic bar material to a machine working the bar, e.g., an automatic lathe, or a wire forming or drawing machine.

In such machines bars which may be approximately 16 feet in length depending upon the diameter of the bar are fed through a feed tube to the operating part of the machine. The bar is grabbed by a chuck and advanced through a feed tube into the machine. During this movement there is a constant rattle and chattering of the bar as it is fed through the feed tube. In a machine shop where several bar fed machines are operating simultaneously the noise level can reach proportions where it is impossible for operatives to speak to each other. This can result in their ill health and reduction of hearing ability.

It is an object of the invention to provide a device which reduces noise generated by the feeding of metallic bar material to bar working machinery.

According to the invention there is provided a device for reducing sound created by feeding of metallic bar material to a machine working the bar, the device comprising a substantially rigid tube of plastics material for positioning around the bar and within the bar carrier tube of said machine, in which said tube has a plurality of longitudingal ribs on its outer curved surface so that in use a plurality of chambers are formed between said plastics tube and the bar feed or carrier tube.

In use the chambers may be left empty the air in the chambers acting as a sound reducing medium. Alternatively, the chambers may be filled with acoustic insulating material for example, cork chippings, asbestos string, expanded polystyrene or granular material such as sand.

Said plastics tube may be made of nylon.

The tube may be formed by plurality of interconnected tubular sections each section being made by injection moulding. Adjacent end portions of the sections may be formed with corresponding projections and recesses for interconnecting said sections. Spacer rings having an external diameter equal to that of said ribs may be formed at intervals along the tube sections. Conveniently, each section is formed by two pieces of semi-circular cross section. The two pieces of each section may be joined by co-operating snap pins and recesses.

Alternatively, the plastics tube may be formed in one piece by extrusion.

This invention will now be described by way of example with reference to the drawings accompanying the Provisional Specification in which:

FIG. 7 is a view in the direction of the arrow F in FIG. 2;

FIG. 8 is a view in the direction of the arrow E in FIG. 2;

FIG. 9 is a side elevation of part of a device according to a second embodiment the invention FIG. 10 is an end view of the device of FIG. 9, and to the accompanying drawings in which

With reference to FIGS. 1 to 8, the device comprises a substantially rigid tube 10 of plastics material for positioning around a bar (not shown) being fed to a bar working machine and within a rigid bar carrier tube (not shown) of the machine. The tube 10 has a plurality of longitudinal ribs 12 and a plurality of integral spacer rings 14 of external diameter equal to that of the ribs disposed at intervals along the tube. Thus in use a plurality of chambers are formed between the bar carrier tube and the outer surface of the tube.

Figure 1:
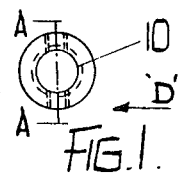
FIG. 1 is an end view of a section of a device according to a first embodiment of the invention.
Figure 2:
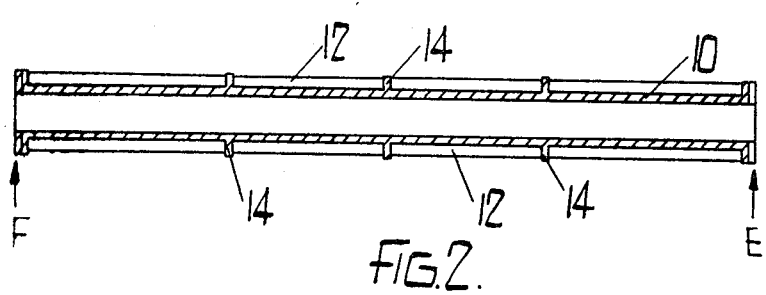
FIG. 2 is a view on the line A—A of FIG. 1.
Figure 3:
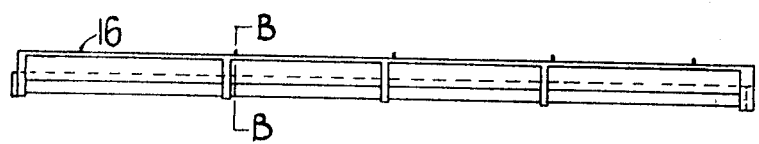
FIG. 3 is a side elevation of part of the device of FIGS. 1 and 2.
Figure 4:
FIG. 4 is a cross sectional view on the line B—B of FIG. 3.
Figure 5:
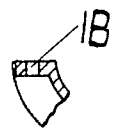
FIGS. 5 & 6 are enlarged views of part of FIG. 4.
Figure 6:
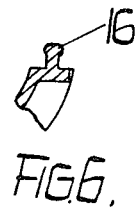

The section shown is formed by injection moulding in two pieces of semi-circular cross section each of which is as shown in FIGS. 3 and 4. The two pieces are formed together by engaging snap pins 16 and recesses 18. To assemble the device a plurality of sections as shown in FIG. 2 are interconnected to form a length substantially equal to the length of the bar carrier tube. Adjacent end portions of the tubes 10 have corresponding dovetail projections and recesses as indicated by the reference numerals 20 and 22 respectively in FIGS. 7 and 8.

Forming the device in a plurality of interconnected sections has advantages from the view point of storage and transportion since the complete tube can be as long as 16 feet.

With reference to FIGS. 9 and 10 the device is formed in a single piece tube 24 by extrusion. The tube 24 has a plurality of longitudinal ribs 26. A plurality of chambers are formed between the outer surface of the tube and the bar feed tube.

Figure 11:
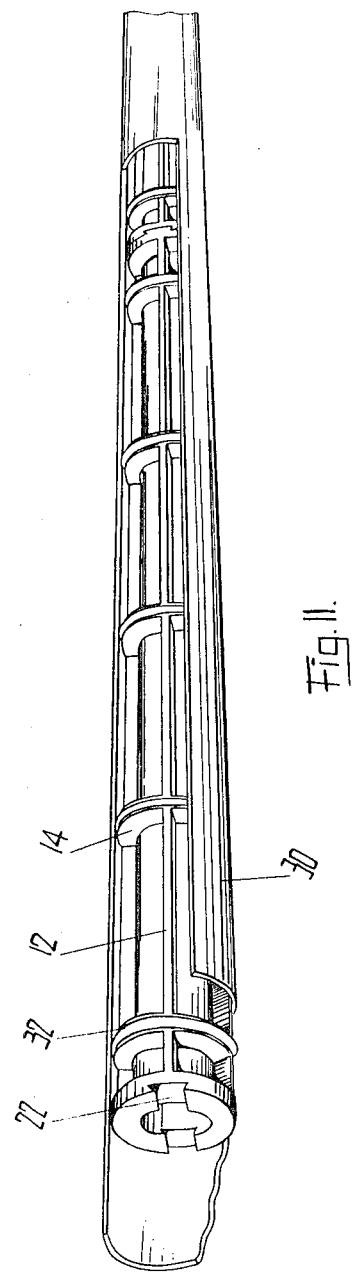
FIG. 11 is a perspective view of a further embodiment.

FIG. 11 is a perspective view of a reaction similar to that of FIGS. 2 and 3 and fitted into a bar feed tube 30. In this embodiment, however, each spacing ring 14 is of channel section and it is fitted with a flexible rubber seal 32 to further reduce the sound created during feeding the bar.

In each of the above embodiments, the chambers may be left empty, the air in the chambers acting as a sound reducing medium. Alternatively, the chambers may be filled with an acoustic insulating material.

In use the completed device is fitted into the feed tube. On passing the metallic bar material through the feed tube, noise and vibration of the bar is absorbed by the device and by the air in the chambers forming a sound absorbent medium or by sound acoustic material in the chambers.

What we claim is:

1. A device for reducing sound created by feeding of metallic bar material to a machine working the bar, the device comprising a substantially rigid tube of plastics material for positioning around the bar and within the bar carrier tube of said machine, in which said tube has a plurality of longitudinal ribs on its curved surface so that in use a plurality of chambers are formed between said plastics tube and the bar feed or carrier tube.

2. A device as claimed in claim 1 wherein the plastics tube is made of nylon.

3. A device as claimed in claim 1 wherein the plastics tube is formed by a plurality of interconnected tubular sections each section being made by injection moulding.

4. A device as claimed in claim 3 wherein adjacent end portions of the sections are formed with corresponding projections and recesses for interconnecting said sections.

5. A device as claimed in claim 3 wherein spacer rings having an external diameter equal to that of said ribs are formed at intervals along the tube sections.

6. A device as claimed in claim 3 wherein each section is formed by two pieces of semi-circular cross section.

7. A device as claimed in claim 6 wherein the two pieces of each section are joinable by co-operating snap pins and recesses provided thereon.

8. In a bar feeding device,
an outer tube,
means for reducing sound created by feeding metallic bar material through said tube comprising,
a substantially rigid inner tube of plastic material of an internal diameter to accommodate the feeding of said metallic bar, and of an outer diameter spaced from the inside diameter of said outer tube, and
a plurality of longitudinal ribs of the same plastics material formed integrally on the outer periphery of said inner tube and being of such height as to engage the inside periphery of said outer tube thereby to form a plurality of chambers between said tubes thereby to reduce said sound.

9. The device specified in claim 11, and
a plurality of spacer rings of the same plastics material as said inner tube formed integrally with said inner tube and being of such diameter as to contact the inner periphery of said outer tube and being spaced at intervals along the inner tube thereby to further divide said chambers.

10. A bar carrier feed tube as claimed in claim 9 wherein the chambers are filled with acoustic insulating material. chippings, asbestos string, expanded polystyrene or granular material such as sand.

* * * * *